United States Patent
Harper et al.

(10) Patent No.: US 10,591,970 B2
(45) Date of Patent: Mar. 17, 2020

(54) INDUSTRIAL ASSET MANAGEMENT SYSTEMS AND METHODS THEREOF

(71) Applicant: ABB Schweiz AG, Baden (CH)

(72) Inventors: Karl Eric Harper, Cary, NC (US); Karen J. Smiley, Benson, NC (US); Steven W. Hudnut, Apex, NC (US)

(73) Assignee: ABB Schweiz AG, Baden (CH)

( * ) Notice: Subject to any disclaimer, the term of this patent is extended or adjusted under 35 U.S.C. 154(b) by 372 days.

(21) Appl. No.: 15/594,751

(22) Filed: May 15, 2017

(65) Prior Publication Data

US 2017/0336849 A1 Nov. 23, 2017

Related U.S. Application Data

(60) Provisional application No. 62/338,266, filed on May 18, 2016.

(51) Int. Cl.
| | |
|---|---|
| *G06F 11/00* | (2006.01) |
| *G06F 1/3209* | (2019.01) |
| *G05B 13/02* | (2006.01) |
| *G06F 1/28* | (2006.01) |
| *G06F 8/65* | (2018.01) |
| *H02J 13/00* | (2006.01) |
| *G06N 20/00* | (2019.01) |

(Continued)

(52) U.S. Cl.
CPC ......... *G06F 1/3209* (2013.01); *G05B 13/029* (2013.01); *G06F 1/28* (2013.01); *G06F 8/66* (2013.01); *H02J 13/0048* (2013.01); *H02J 13/0062* (2013.01); *G06N 3/02* (2013.01); *G06N 3/08* (2013.01); *G06N 20/00* (2019.01); *H02J 13/0006* (2013.01); *H04B 2203/5495* (2013.01); *Y02B 90/2638* (2013.01); *Y02E 60/7838* (2013.01); *Y04S 40/124* (2013.01)

(58) Field of Classification Search
CPC . G06F 1/28; G06F 1/3209; G06F 8/66; G05B 13/029; H02J 13/0048; H02J 13/0062
See application file for complete search history.

(56) References Cited

U.S. PATENT DOCUMENTS

| | | | | |
|---|---|---|---|---|
| 4,495,568 A | * | 1/1985 | Gilbert | G06F 11/328 713/330 |
| 6,952,680 B1 | * | 10/2005 | Melby | G06Q 10/04 705/28 |

(Continued)

*Primary Examiner* — Joshua P Lottich
(74) *Attorney, Agent, or Firm* — Taft Stettinius & Hollister LLP; J. Bruce Schelkopf

(57) ABSTRACT

An industrial asset management system includes a data acquisition system configured to receive asset data associated with at least one industrial asset and to modify the data acquisition system to enable the continued receipt of asset data associated with the at least one industrial asset in response to a detection of an internal change at the data acquisition system by the data acquisition system and a data processing system communicatively coupled to the data acquisition system and configured to process the asset data received from the data acquisition system and to modify the data processing system for the continued processing of the asset data in response to a detection by the data processing system of an internal change at the data processing system or the data acquisition system.

23 Claims, 5 Drawing Sheets

(51) Int. Cl.
    *G06N 3/08*    (2006.01)
    *G06N 3/02*    (2006.01)

(56)              References Cited

U.S. PATENT DOCUMENTS

| | | | |
|---|---|---|---|
| 7,152,035 B1* | 12/2006 | Suhy, Jr. | G06Q 10/08 |
| | | | 705/305 |
| 8,046,625 B2 | 10/2011 | Ferguson | |
| 8,170,893 B1* | 5/2012 | Rossi | G06Q 10/063 |
| | | | 705/7.11 |
| 8,209,205 B1* | 6/2012 | McElroy | G05B 19/418 |
| | | | 705/7.12 |
| 2005/0131729 A1* | 6/2005 | Melby | G06Q 10/06 |
| | | | 705/29 |
| 2014/0358601 A1* | 12/2014 | Smiley | G06Q 10/0635 |
| | | | 705/7.11 |
| 2014/0365190 A1* | 12/2014 | Mahate | G06F 17/5009 |
| | | | 703/7 |
| 2014/0365191 A1* | 12/2014 | Zyglowicz | G06F 17/5009 |
| | | | 703/7 |
| 2014/0365264 A1* | 12/2014 | Smiley | G06Q 10/06315 |
| | | | 705/7.25 |
| 2014/0371942 A1* | 12/2014 | Matsuyama | H02J 3/14 |
| | | | 700/297 |
| 2016/0274558 A1* | 9/2016 | Strohmenger | G05B 19/0428 |
| 2019/0207388 A1* | 7/2019 | Li | G06Q 10/06 |

\* cited by examiner

INDUSTRIAL ASSET MANAGEMENT SYSTEMS AND METHODS THEREOF

FIELD

The field of the invention generally relates to industrial systems and more particularly to methods and systems for managing the industrial assets of industrial systems.

BACKGROUND

Many industries such as electric utilities, mining operations, and water utilities employ industrial systems including a relatively large number of industrial assets. An industrial asset may, for example, include one or more of industry infrastructure, operating equipment, tangible equipment, physical equipment, and processing equipment. An industrial asset may have an intrinsic value based upon one or more parameters including, but not limited to, product produced using the industrial asset, operating costs of the industrial asset, and losses associated with use of the industrial asset. An industrial asset may be serviceable as a set of components or as a single entity.

An example of an industry that employs an industrial system including industrial assets may be an electric utility company. An electric utility company may include a power transmission and distribution system. The power transmission and distribution system may include a plurality of industrial assets, including, for example, transmission lines, substations, transformers, circuit breakers, inverters, controllers, power sources, power storage devices, and other types of industrial assets. The management of such industrial assets may include industrial asset operation, industrial asset maintenance, industrial asset health monitoring, and industrial asset inventory tracking.

The power transmission and distribution system may span relatively large geographical regions including multiple cities, states, or countries. The electric utility company may send technicians to industrial asset locations to perform modifications, software upgrades, visual inspections and testing of the industrial assets.

SUMMARY

In an embodiment, an industrial asset management system includes a data acquisition system configured to receive asset data associated with at least one industrial asset and to modify the data acquisition system to enable the continued receipt of asset data associated with the at least one industrial asset in response to a detection of an internal change at the data acquisition system by the data acquisition system and a data processing system communicatively coupled to the data acquisition system and configured to process the asset data received from the data acquisition system and to modify the data processing system for the continued processing of the asset data in response to a detection by the data processing system of an internal change at the data processing system or the data acquisition system.

In an embodiment, a method of managing industrial assets of an industrial system includes receiving asset data associated with at least one industrial asset at a data acquisition system, if an internal change is detected at the data acquisition system by the data acquisition system, performing an internal modification at the data acquisition system to enable the continued receipt of asset data associated with the at least one industrial asset, receiving asset data from the data acquisition system at the data processing system, processing the received asset data at the data processing system, and if an internal change is detected at the data processing system by the data processing system, performing an internal modification at the data processing system for the continued processing of the asset data.

In an embodiment, a power transmission and distribution asset management system includes a data acquisition system configured to receive asset data associated with at least one power transmission and distribution system asset and to modify the data acquisition system to enable the continued receipt of asset data associated with the at least one power transmission and distribution system asset in response to a detection of an internal change at the data acquisition system by the data acquisition system and a data processing system communicatively coupled to the data acquisition system and configured to process the asset data received from the data acquisition system and to modify the data processing system for the continued processing of the asset data in response to a detection of an internal change at the data processing system by the data processing system.

DETAILED DESCRIPTION

Figure 1:
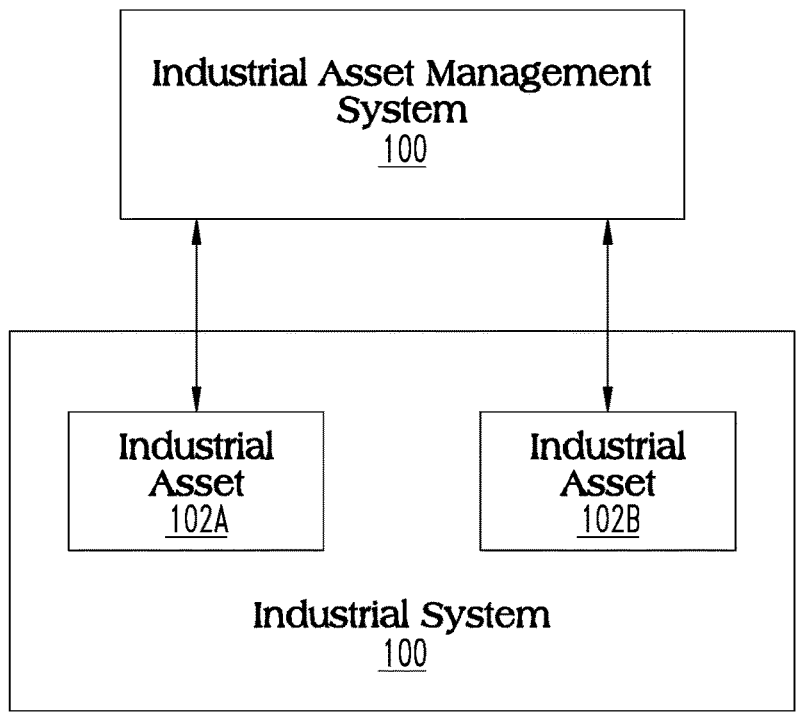
FIG. 1 is a block diagram representation of an embodiment of an industrial asset management system communicatively coupled to a plurality of industrial assets of an industrial system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Referring to FIG. 1, an embodiment of an industrial asset management system 100 is communicatively coupled to a plurality of industrial assets 102A, 102B of an industrial system 103. While the industrial asset management system 100 is shown as communicatively coupled to two industrial assets 102A, 102B, the industrial asset management system 100 may be communicatively coupled to a fewer or a greater number of industrial assets 102A, 102B.

An industrial asset 102A, 102B may, for example, include one or more of industry infrastructure, operating equipment, tangible equipment, physical equipment, processing equipment, sensors, monitors, equipment without built-in sensors, and smart equipment with built-in sensors. An industrial asset 102A, 102B may have an intrinsic value based upon one or more parameters including, but not limited to, product produced using the industrial asset 102A, 102B, operating costs of the industrial asset 102A, 102B, and losses associated with use of the industrial asset 102A, 102B. An industrial asset 102A, 102B may be serviceable as a set of components or as a single entity. The management of such industrial assets 102A, 102B may include industrial asset operation, industrial asset maintenance, industrial asset health monitoring, and industrial asset inventory tracking.

An example of an industrial system 103 that may include a plurality of industrial assets 102A, 102B is a power transmission and distribution system. The industrial asset management system 100 may be communicatively coupled to one or more of the plurality of industrial assets 102A, 102B of the power transmission and distribution system. Examples of industrial assets 102A, 102B in a power transmission and distribution system include, but are not limited to, transmission lines, substations, transformers, circuit breakers, inverters, controllers, power storage devices such as batteries and flywheels, power poles, towers, and power sources. The industrial assets 102A, 102B of a power transmission and distribution system may also be referred to as power transmission and distribution system assets. An industrial asset management system 100 that is used to manage power transmission and distribution system assets may be referred to as a power transmission and distribution asset management system. Other examples of industrial systems 103, include but are not limited to, industrial systems associated with mining operations and water utilities. The industrial asset management system 100 may be used to manage the industrial assets 102A, 102B of such industrial systems.

The industrial asset management system 100 is configured to receive asset data associated with one or more of the industrial assets 102A, 102B. Examples of asset data associated with the one or more industrial assets 102A, 102B include, but are not limited to, asset health data, asset change data, asset operating data, asset operating environment data, asset performance data, asset operation data, asset maintenance data, asset monitoring data, and asset inventory tracking data. The industrial asset management system 100 is configured to process the received asset data. In an embodiment, the industrial asset management system 100 is configured to detect an internal change within the industrial asset management system 100 and responsively modify the industrial asset management system 100 for the continued operation of the industrial asset management system 100. In an embodiment, the industrial asset management system 100 is configured to detect a change associated with at least one of the industrial assets 102A, 102B and responsively modify the industrial asset management system 100 to accommodate the detected change. In an embodiment, the industrial asset management system 100 is configured to detect a change associated with at least one of the industrial assets 102A, 102B and responsively modify the industrial asset 102A, 102B. In an embodiment, the industrial asset management system 100 is configured to detect a change associated with at least one of the industrial assets 102A, 102B and responsively modify at least one other of the industrial assets 102A, 102B. In an embodiment, the industrial asset management system 100 is configured to detect a change associated with at least one of the industrial assets 102A, 102B and determine that no action is required.

In an embodiment, the industrial asset management system 100 is configured to perform a modification to the industrial asset management system 100 to enable the continued receipt of asset data associated with one or more of the industrial assets 102A, 102B in response to the detected change. In an embodiment, the industrial asset management system 100 is configured to perform a modification to the industrial asset management system 100 for the continued processing of the received asset data in response to the detected change. In an embodiment, the industrial asset management system 100 is configured to present the received asset data via a user interface. In an embodiment, the industrial asset management system 100 is configured to present the processed asset data via a user interface. In an embodiment, the industrial asset management system 100 is configured to present the received and/or processed asset data associated with one or more modifications to the industrial asset management system 100 via a user interface. In an embodiment, the industrial asset management system 100 is configured to present the received and/or processed asset data associated with modifications to an industrial asset 102A, 102B via a user interface.

Figure 2:
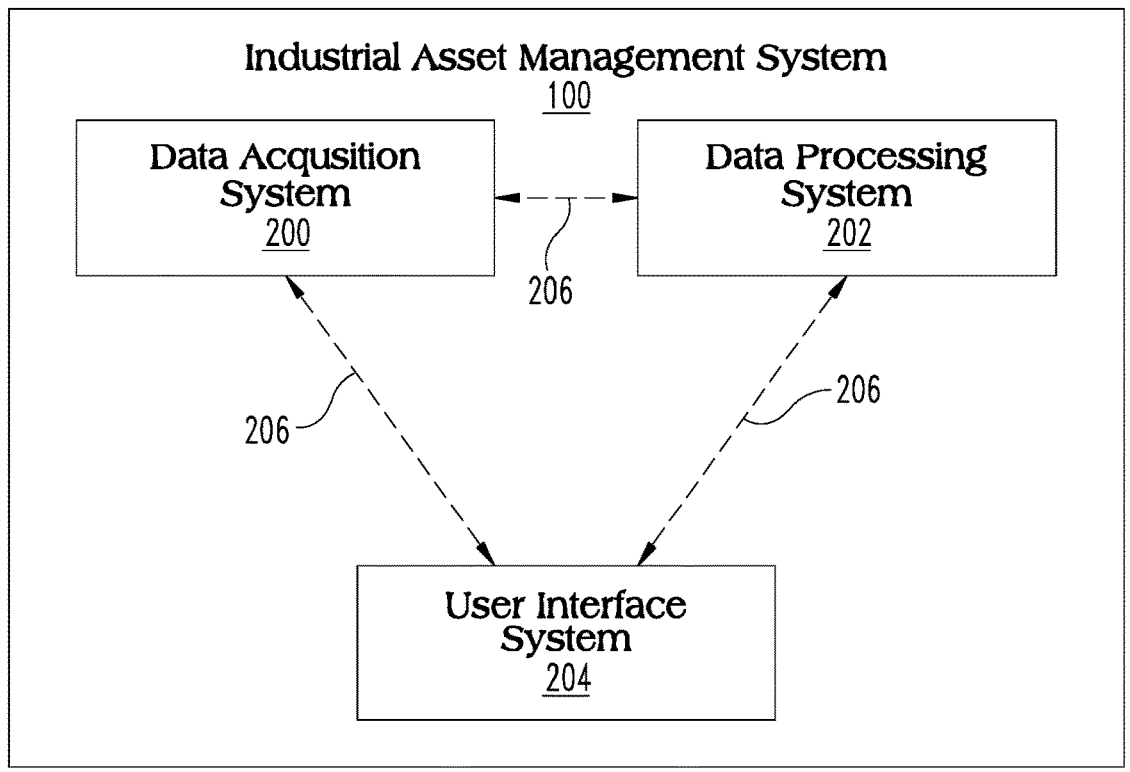
FIG. 2 is a block diagram representation of an embodiment of an industrial asset management system.

Referring to FIG. 2, an embodiment of an industrial asset management system 100 is shown. The industrial asset management system 100 includes a data acquisition system 200, a data processing system 202 and a user interface system 204. The data acquisition system 200, the data processing system 202 and a user interface system 204 are communicatively coupled via a communication system 206. The communication system 206 can be any one or combination of a central communication system mesh network, or peer-to-peer system with respect to the data acquisition system 200, data processing system 202, and user interface system 204

The data acquisition system 200 is configured to receive asset data associated with at least one of the industrial assets 102A, 102B. The data acquisition system 200 transmits the received asset data to the data processing system 202 via the communication system 206. In an embodiment, the data acquisition system 200 formats and/or configures the received asset data prior to forwarding the asset data to the data processing system 202 via the communication system 206.

The data processing system 202 is configured to perform data processing functions on the received asset data and generate processed asset data. The data processing system 202 transmits the processed asset data to the user interface system 204 via the communication system 206. In an embodiment, the data processing system 202 aggregates the asset data received from the data acquisition system 200. The data processing system 202 transmits the aggregated asset data to the user interface system 204 via the communication system 206.

In an embodiment, the user interface system 204 is configured to present the asset data via a user interface. In an embodiment, the user interface system 204 is configured to present the processed asset data via a user interface. In an embodiment, the user interface system 204 is configured to visually present data received from the data processing system 202 via a user interface display system.

The data acquisition system 200 is configured to detect an internal change within the data acquisition system 200 and responsively modify the data acquisition system 200 based on the detected internal change to enable the continued receipt of asset data for the associated industrial assets 102A, 102B. In an embodiment, the data acquisition system 200 is configured to detect a change associated with at least one of the industrial assets 102A, 102B based on the received asset data and responsively modify the data acquisition system 200 based on the detected change. In an embodiment, the data acquisition system 200 is configured to detect a change associated with at least one of the industrial assets 102A, 102B based on the received asset data and reconfigure the at least one of the industrial assets 102A, 102B based on the detected change.

In an embodiment, the data acquisition system 200 is configured to detect removal of an industrial asset 102A, 102B and responsively perform an internal modification to disable the communication channel associated with the removed industrial asset 102A, 102B. In an embodiment, the data acquisition system 200 is configured to detect a physical removal of an industrial asset 102A, 102B and responsively perform an internal modification to disable the communication channel associated with the removed industrial asset 102A, 102B. In an embodiment, the data acquisition system 200 is configured to detect a logical removal of an industrial asset 102A, 102B and responsively perform an internal modification to disable the communication channel associated with the removed industrial asset 102A, 102B.

In an embodiment, the data acquisition system 200 is configured to detect the addition of an industrial asset 102A, 102B and responsively perform an internal modification to enable communication with the newly added industrial asset 102A, 102B. In an embodiment, the data acquisition system 200 is configured to detect the physical addition of an industrial asset 102A, 102B and responsively perform an internal modification to enable communication with the newly added industrial asset 102A, 102B. In an embodiment, the data acquisition system 200 is configured to detect the logical addition of an industrial asset 102A, 102B and responsively perform an internal modification to enable communication with the newly added industrial asset 102A, 102B.

In an embodiment, the data acquisition system 200 is configured to detect a reconfiguration of an industrial asset 102A, 102B and responsively perform an internal modification to accommodate the reconfiguration. In an embodiment, the data acquisition system 200 is configured to detect repair of an industrial asset 102A, 102B and responsively perform an internal modification to accommodate the repair. In an embodiment, the data acquisition system 200 is configured to detect a change in location of an industrial asset 102A, 102B and responsively perform an internal modification to accommodate the change in location. In an embodiment, the data acquisition system 200 is configured to detect a modification to an industrial asset 102A, 102B and responsively perform an internal modification to accommodate the modification to the industrial asset 102A, 102B. In an embodiment, the data acquisition system 200 is configured to detect failure of an industrial asset 102A, 102B and responsively perform an internal modification to accommodate the failure of the industrial asset 102A, 102B. In an embodiment, the data acquisition system 200 is configured to detect a fault condition associated with an industrial asset 102A, 102B and responsively perform an internal modification to accommodate the fault condition associated with the industrial asset 102A, 102B.

In an embodiment, the data acquisition system 200 is configured to detect replacement of an industrial asset 102A, 102B and responsively perform an internal modification to accommodate the replacement. The detected replacement of an industrial asset 102A, 102B may for example include, but is not limited to, detection of replacement of an industrial asset 102A, 102B with a different instance of the industrial asset 102A, 102B, detection of replacement of an industrial asset 102A, 102B with a different type of industrial asset 102A, 102B, or detection of replacement of an industrial asset 102A, 102B with a different model of the industrial asset 102A, 102B.

In an embodiment, the data acquisition system 200 is configured to detect a change associated with an industrial asset 102A, 102B based on a change in the asset data received from the industrial asset 102A, 102B. In an embodiment, the change in the asset data received from the industrial asset 102A is a reduction in the amount of asset data received from the industrial asset 102A, 102B. In an embodiment, the change in the asset data received from an industrial asset 102A, 102B is an increase in the asset data received from the industrial asset 102A, 102B. In an embodiment, the change in the asset data received from the industrial asset 102A, 102B is a deviation from an expected asset data value or expected asset data values associated with the received asset data. In certain embodiments, the expected asset data value can include a threshold value or range of values associated with, for example, a voltage, a current, a frequency, or other suitable variables or conditions. In an embodiment, the data acquisition system 200 is configured to transmit modified instructions to the industrial asset 102A, 102B in response to the detected change.

The data processing system 202 is configured to detect an internal change within the data processing system 202 and to modify the data processing system 202 in response to the detected internal change for the continued data processing of the asset data received from the data acquisition system 200. The modification of data processing system 202 for the continued data processing may include enabling the continued data processing of the asset data, modifying the continued data processing of the asset data, suspending the continued data processing of the asset data, suspending or modifying asset data acquisition, and/or starting or modifying an alternative asset data acquisition.

In an embodiment, the data processing system 202 is configured to detect a change associated with the data acquisition system 200 and to modify the data acquisition system 200 in response to the detected change. In an embodiment, the data processing system 202 is configured to detect a change associated with the data acquisition system 200 and to modify the data processing system 202 in response to the detected change.

In an embodiment, the data processing system 202 is configured to detect a change associated with the user interface system 204 and to modify the user interface system 204 in response to the detected change. In an embodiment, the data processing system 202 is configured to detect a change associated with the user interface system 204 and to modify the data processing system 202 in response to the detected change.

In an embodiment, the industrial management system 100 includes a plurality of data acquisition systems 200 (not shown). In an embodiment, a first one of the plurality of data acquisition systems 200 is configured to detect a change in a second one of the plurality of data acquisition systems 200. In an embodiment, the industrial asset management system 100 is configured to perform one or more modifications in response to the detected change to enable the continued receipt of asset data for the associated industrial assets 102A, 102B.

In an embodiment, the industrial management system 100 includes a plurality of data processing systems 202 (not shown). In an embodiment, a first one of the plurality of data processing systems 202 is configured to detect a change in a second one of the plurality of data processing systems 202. In an embodiment, the industrial asset management system 100 is configured to perform one or more modifications in response to the detected change for the continued data processing of asset data received from the data acquisition system 200.

In an embodiment, the data processing system 202 is configured to be restricted from initiating communications with the data acquisition system 200. In one embodiment, the restriction is a total restriction in response to a detected change in the industrial asset management system 100. In a further embodiment, there is no listener at the data acquisition system 200 to receive asset data under a total restriction, and asset data routed between the data processing system 202 and the data acquisition system 200 through communication system 206 is blocked until the total restriction is lifted. In another embodiment, the data acquisition system 200 initiates communication with the data processing system 202. In an embodiment, the data processing system 202 is configured to enable the initiation of communications with the data acquisition system 200. In an embodiment, the data processing system 202 is configured to be selectively enabled or disabled from initiating communications with the data acquisition system 200.

In an embodiment, the management of the initiation of communications by the data processing system 202 with the data acquisition system 200 may be implemented with partial restrictions as a security procedure. The security procedure may be implemented, for example, in response to a change to the industrial asset management system 100. The security procedure may be triggered by, for example, a change in asset data associated with an industrial asset 102A, 102B. Examples of security procedure inducing changes include, but are not limited to, a denial of communication, an emergent pattern or trend in received asset data, and a spike in the received asset data. The security procedure may be implemented as a total restriction or a partial restriction to restrict access to the industrial asset management system 100 by a potential attacker. The security procedure may be implemented to, for example, restrict access to asset data, prevent a functionality change to an industrial asset 102A, 120B, prevent a functionality change to the data acquisition system 200, or prevent a functionality change to the data processing system 202. Responsive to a detected attack or threat, a security configuration may be modified at the industrial asset management system 100 to mitigate access to information and/or modification by the attack.

In an embodiment, in the event there is a disruption in communication between the data acquisition system 200 and the data processing system 202, the data acquisition system 200 is configured to continue to receive asset data for the associated one or more industrial assets 102A, 102B and to store the received asset data at the data acquisition system 200 until communication is reestablished between the data acquisition system 200 and the data processing system 202. In an embodiment, in the event there is a disruption in communication between the data acquisition system 200 and the data processing system 202, the data processing system 202 is configured to continue the performance of data processing of the asset data received from data acquisition system 200 prior to the disruption in communication. In an embodiment, in the event there is a disruption in communication between the data acquisition system 200 and the data processing system 202, the data processing system 202 is configured to continue the aggregation of asset data received from the data acquisition system 200 prior to the disruption in communication.

In an embodiment, in the event there is a communication disruption between the data processing system 202 and the user interface system 204, the data processing system 202 is configured to store the received asset data and the processed asset data at the data processing system 202 until communication is reestablished between the data processing system 202 and the user interface system 204.

The data acquisition system 200, the data processing system 202 and the user interface system 204 may be interconnected logically and/or physically to provide operational isolation and fault isolation between the data acquisition system 200, the data processing system 202 and the user interface system 204. For example, in such a configuration, taking a component of the data acquisition system 200 offline does not impact the operation of other components of the data acquisition system 200, the data processing system 202 and the user interface system 204. In another example, components of the different systems 200, 202, 204 may discover one another and/or discover new industrial assets 102A, 102B, such as for example, through an auto-discovery process.

In an embodiment, the user interface system 204 is configured to display asset data and processed asset data on a user interface display system. In an embodiment, the user interface system 204 includes a user interface configured to receive data via the communication system 206. In an embodiment, the user interface system 204 is configured to communicate with various different devices via a web interface supported by a web application and/or a web service.

In an embodiment, the user interface system 204 is configured to provide an actionable notification associated with the asset data and/or the processed asset data. Examples of actionable notifications include, but are not limited to, a notification to perform maintenance, a triggered alert such as a temperature being above a threshold value and instructions as to how to replace and/or compensate for a failed industrial asset 102A, 102B.

In an embodiment, the user interface system 204 is configured to display a variety of information such as for example, including but not limited to, a geo-location of an industrial asset 102A, 102B, a health status of an industrial asset 102A, 102B, a software state of an industrial asset 102A, 102B, and a hardware state of an industrial asset 102A, 102B. In an embodiment, the user interface system 204 is configured to implement business intelligence and/or reporting functionality, which may be displayed via the user interface display system. In an embodiment, the user interface system 204 is configured to display nominal asset data collection rates and deviations from the normal asset data collection rates.

In an embodiment, the data processing system 202 is configured to provide asset data and/or processed asset data to the user interface system 204. The user interface system 204 is configured to display one or more of asset data, processed asset data, data received from the data processing system 202, changes detected at an industrial asset 102A, 102B, changes detected at the data acquisition system 200, changes detected at the data processing system 202, changes detected at the industrial asset management system 100, modifications made to an industrial asset 102A, 102B, modifications made to the data acquisition system 200, modifications made to the data processing system 202, and modifications made to the industrial asset management system 100.

Figure 3:
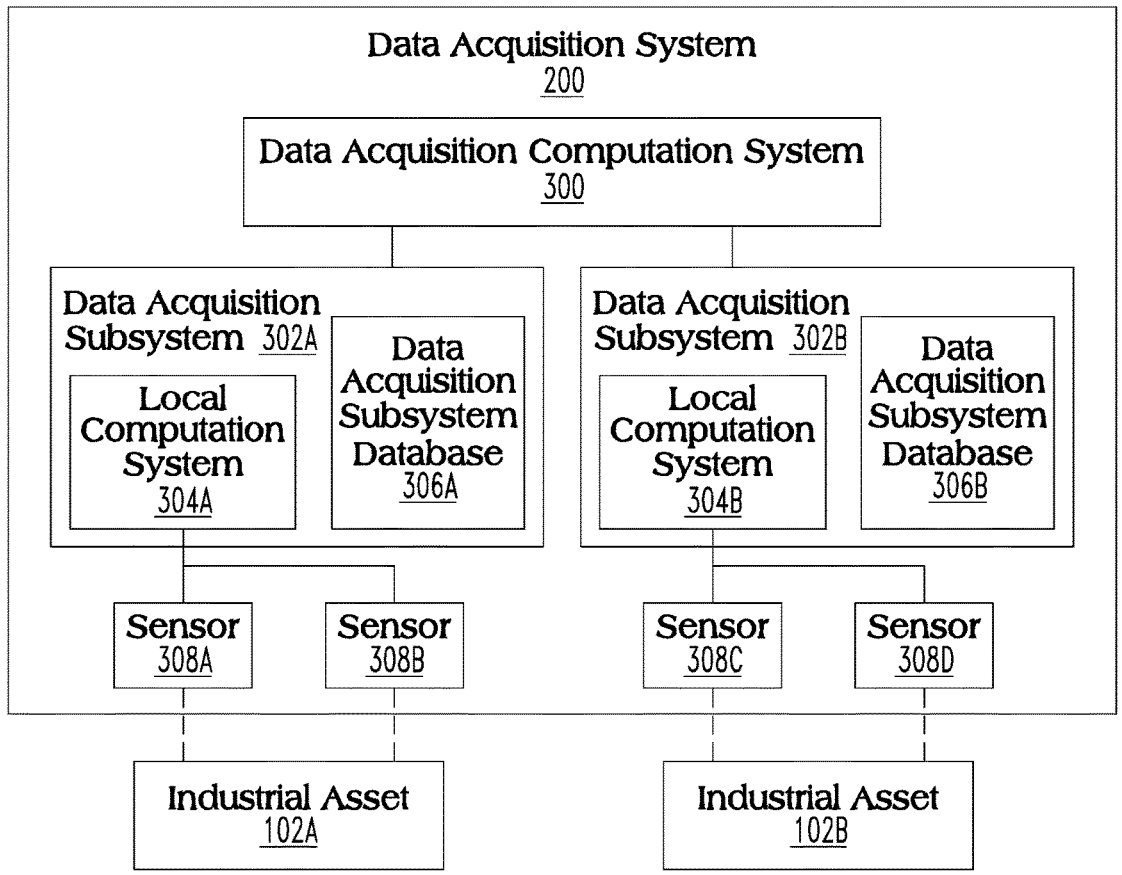
FIG. 3 is a block diagram representation of an embodiment of a data acquisition system of an industrial asset management system.

Referring to FIG. 3, a block diagram representation of an embodiment of a data acquisition system 200 is shown. The data acquisition system 200 includes a data acquisition system computation system 300 communicatively coupled to one or more data acquisition subsystems 302A, 302B. While two data acquisition subsystems 302A, 302B are shown, a data acquisition system 200 may include a greater or fewer number of data acquisition subsystems 302A, 302B.

The data acquisition computation system 300 is configured to manage one or more data acquisition subsystems 302A, 302B in the data acquisition system 200. For example, the data acquisition computation system 300 may be configured to provide one or more instructions to the data acquisition subsystems 302A, 302B. Examples of instructions provided by the data acquisition computation system 300 to the data acquisition subsystems 302A, 302B include, but are not limited to, a software update, a firmware update, a configuration change, a request for operating data collected by the data acquisition subsystem 302A, 302B, a functionality change, and implementation of an operating parameter. An example of a functionality change is an instruction to stop monitoring a particular parameter. An example of an implementation of an operating parameter is implementation of a new temperature alarm value. Individual data acquisition subsystems 302A, 302B may be upgraded or taken off line without impacting the performance of the other data acquisition subsystems 302A, 302B within the data acquisition system 200.

In an embodiment, each of the data acquisition subsystems 302A, 302B is configured to be communicatively coupled to an associated industrial asset 102A, 102B. The data acquisition subsystems 302A, 302B may be located in different geographic locations. For example, the first and second industrial assets 102A, 102B may be located in first and second substations, respectively. The first and second substations may be located at first and second geographic locations, respectively. The first data acquisition subsystem 302A may be located in the first geographic location associated with the first industrial asset 102A and the second data acquisition subsystem 302B may be located in the second geographic location associated with the second industrial asset 102B.

In an embodiment, each of the data acquisition subsystems 302A, 302B includes a local computation system 304A, 304B communicatively coupled to one or more data acquisition subsystems databases 306A, 306B, and to one or more sensors 308A, 308B, 308C, 308D. The sensors 308A, 308B, 308C, 308D are configured to be communicatively coupled to an associated industrial asset 102A, 102B and to collect asset data associated with the associated industrial asset 102A, 102B. For example, the sensors 308A, 308B in the first data acquisition subsystem 302A may be configured to collect asset data associated with the first industrial asset 102A and the sensors 306C, 306D in the second data acquisition subsystem 302A may be configured to collect asset data associated with the second industrial asset 102B.

In an embodiment, one or more of the sensors 308A, 308B, 308C, 308D may be integral with the associated industrial asset 102A, 102B. In an embodiment, one or more of the sensors 308A, 308B, 308C, 308D may be discrete or separate from the associated industrial asset 102A, 102B. In an embodiment, one or more of the sensors 308A, 308B, 308C, 308D may be integral with the associated industrial asset 102A, 102B and one or more of the sensors 308A, 308B, 308C, 308D may be discrete or separate from the associated industrial asset.

Examples of the asset data collected by the sensors 308A, 308B, 308C, 308D include, but are not limited to, industrial asset configuration data, industrial asset condition data and industrial asset performance data. Examples of industrial asset condition data include, but are not limited to, operating speed, power supply capability, operating temperatures, value of load supplied by industrial asset, current measurement, voltage measurement, time elapsed since last maintenance, current firmware version, and other operation parameters. An example of industrial asset performance data includes, but is not limited to, whether an industrial asset is operating below specification due to degradation. Examples of types of sensors 308A, 308B, 308C, 308D include, but are not limited to, temperature sensors, voltage sensors, current sensors, and microprocessor sensors.

In an embodiment, the local computation systems 304A, 304B are configured to receive asset data from the associated sensors 308A, 308B, 308C, 308D. For example, the local computation system 304A in the first data acquisition subsystem 302A may be configured to receive asset data collected by the sensors 308A, 308B from the first industrial asset 102A and the local computation system 304B in the second data acquisition subsystem 302B may be configured to receive asset data collected by the sensors 308C, 308D from the second industrial asset 102B. In an embodiment, the local computation systems 302A, 302B are configured to format and/or configure the asset data received from the associated industrial assets 102A, 102B prior to transmitting the asset data to the data processing system 202. Examples of formatting and/or configuration of the asset data that may be performed at the data acquisition subsystems 302A, 302B include, but are not limited to, engineering unit conversions, calculated values, maintenance scheduling, alarm triggering, and current operation condition detection.

In an embodiment, a data acquisition subsystem 302A, 302B may be in a distributed configuration with respect to the associated industrial asset 102A, 102B. For example, one or more of the sensors 308A, 308B, 308C, 308D may be local or integral to the associated industrial asset 102A, 102B while the local computation system 304A, 304B and/or the data acquisition subsystem database 306A, 306B may be physically separated from and remotely coupled to the associated industrial asset 102A, 102B. The data acquisition subsystems 302A, 302B and capabilities may be implemented in hardware or software.

In an embodiment, the data acquisition subsystem databases 306A, 306B in each of the data acquisition subsystems 302A, 302B are configured to store the asset data received from the associated industrial asset 102A, 102B. In an embodiment, the data acquisition subsystem databases 306A, 306B are configured to store the formatted and/or configured asset data of the associated industrial asset 102A, 102B generated by the local computation systems 304A, 304B. In an embodiment, the data acquisition subsystem databases 306A, 306B in each of the data acquisition subsystems 302A, 302B are configured to store the asset operating data, another type of asset data, of the associated industrial asset 102A, 102B.

In an embodiment, the data acquisition system 200 is configured to transmit the asset data from the industrial assets 102A, 102B collected via the sensors 308A, 308B, 308C, 308D to the data processing system 202 via the communication system 206. In an embodiment, the data acquisition system 200 is configured to transmit the raw asset data collected via the sensors 308A, 308B, 308C, 308D to the data processing system 202 via the communication system 206. In an embodiment, the data acquisition system 200 is configured to transmit the formatted and/or configured asset data to the data processing system 202 via the communication system 206. In an embodiment, the data acquisition system 200 is configured to transmit asset operating data, another type of asset data of the associated industrial assets 102A, 102B, to the data processing system 202 via the communication system 206.

In an embodiment, in the event one of the data acquisition subsystems 302A, 302B experiences a fault that disrupts communications between the data acquisition subsystem 302A, 302B and the data processing system 202 via the communication system 206, a non-disruptive failover operation may be implemented. During the implementation of the non-disruptive failover operation, the data acquisition subsystems 302A, 302B are configured to continue to perform data acquisition functions associated with the industrial assets 102A, 102B and store the asset data received at the data acquisition subsystems 302A, 302 and/or generated by the data acquisition subsystems 302A, 302 in the data acquisition subsystem databases 306A, 306B. In an embodiment, the data acquisition subsystem 302A, 302B is configured to continue to collect asset data from the associated industrial asset 102A, 102B and to store the collected asset data in the data acquisition subsystem database 306A, 306B. The stored data, intended for transmission to the data processing system 202, is retrieved from the data acquisition subsystem database 306A, 306B and transmitted to the data processing system 202 via the communication system 206 when the data acquisition subsystem 302A, 302B reestablishes communication with the data processing system 202 via the communication system 206.

In an example, the data acquisition system 200 may detect a change at the industrial system 103 that corresponds to an addition of a new industrial asset 102A, 102B to the industrial system 103. In an embodiment, the newly added industrial asset 102A, 102B may issue an asset discovery request, such as for example, in the form of a heartbeat signal. The asset discovery request issued by the newly added industrial asset 102A, 102B is detected by the data acquisition system 200. The data acquisition system 200 may be configured to transmit a data acquisition system asset discovery request to the newly added industrial asset 102A, 102B in response to the asset discovery request detected by the data acquisition system 200 to "discover" the newly added industrial asset 102A, 102B.

In an example, the data acquisition system 200 may detect a change at the industrial system 103 that corresponds to a removal of an industrial asset 102A, 102B from the industrial system 103. In an embodiment, the data acquisition system 200 may detect the removal of an industrial asset 102A, 102B based on a detected loss of a heartbeat signal associated with the removed industrial asset 102A, 102B. In an embodiment, the data acquisition system 200 may detect the removal of an industrial asset 102A, 102B based on a detected lack of receipt of asset data associated with the removed industrial asset 102A, 102B. The data acquisition system 200 modifies the data acquisition 200 in response to the removal of the industrial asset 102A, 102B.

In an example, the data acquisition system 200 may detect a change at the industrial system 103 that corresponds to a change to an industrial asset 102A, 102B of the industrial system 103. Examples of changes to an industrial asset 102A, 102B include, but are not limited to, an update to firmware of the industrial asset 102A, 102B, a repair to the industrial asset 102A, 102B, a replacement of the industrial asset 102A, 102B, and a reconfiguration for the industrial asset 102A, 102B.

Responsive to detecting the change at the industrial asset 102A, 102B, the industrial asset management system 100 may perform a modification to the industrial asset management system 100 to enable the continued receipt of asset data associated with the changed industrial asset 102A, 102B at the data acquisition system 200 and/or for the continued performance of data processing functions at the data processing system 202. In an embodiment the data processing system 202 is modified and/or enabled for the continued receipt of asset data from the changed industrial asset 102A, 102B. In an embodiment, the data acquisition system 200 modifies the data acquisition subsystem 302A, 302B associated the changed industrial asset 102A, 102B to enable the continued receipt of asset data from the changed industrial asset 102A, 102B at the associated data acquisition subsystem 302A, 302B. In an embodiment, the data acquisition system 200 implements a modification of a sensor 306A, 306B, 306C, 306D at the changed industrial asset 102A, 102B to enable the continued receipt of asset data from the changed industrial asset 102A, 102B. In an embodiment, the data acquisition system 200 implements a modification of the changed industrial asset 102A, 102B to enable the continued receipt of asset data from the changed industrial asset 102A, 102B. The detected change at the industrial asset 102A, 102B and/or modifications performed in response to the detected change may be displayed at the user interface system 204.

Figure 4:
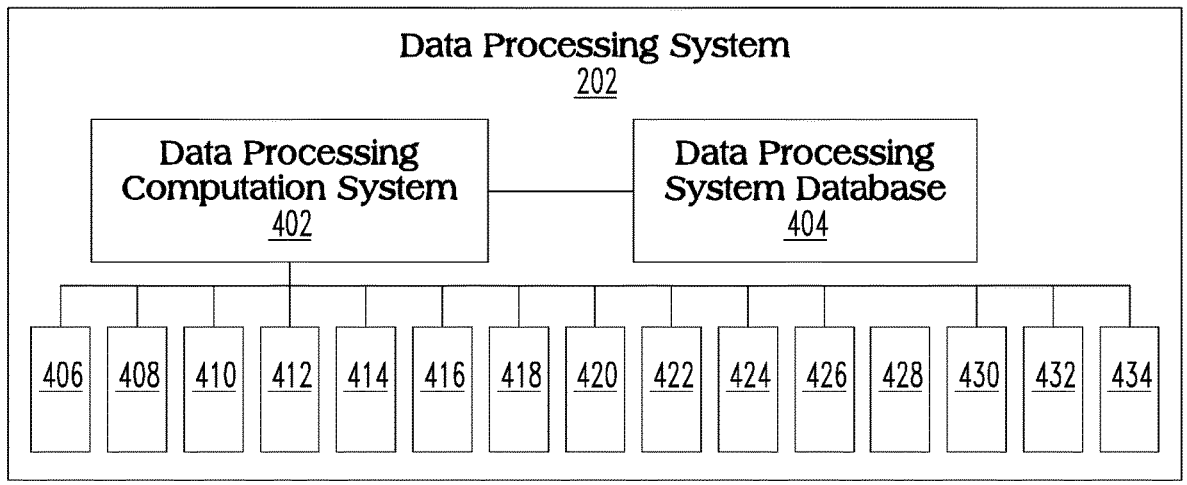
FIG. 4 is a block diagram representation of an embodiment of a data processing system of an industrial asset management system.

Referring to FIG. 4 a block diagram representation of an embodiment of a data processing system 202 is shown. The data processing system 202 includes a data processing computation system 402 communicatively coupled to a data processing system database 404. The data processing computation system 402 is configured to implement one or more different applications at the data processing system 202. The data processing system computation system 402 is configured to implement the one or more different applications or data processing functions using one or more data processing modules 406, 408, 410, 412, 414, 416, 418, 420, 422, 424, 426, 428, 430, 432, 434.

In an embodiment, the data processing system 202 includes a calculated value module 406, a statistical analysis module 408, a workflow management module 410, a trending module 412, an industrial asset classification module 414, a firmware update module 416, a functionality change module 418, a configuration change module 420, a software update module 422, a decision support module 424, a data storage module 426, a data adapter module 428, a service adapter module 430, a data mining module 432, and a machine learning module 434. One example of a machine learning module 434 is a neural network. Alternative embodiments of the data processing system 202 may include a combination of one or more of the calculated value module 406, the statistical analysis module 408, the workflow management module 410, the trending module 412, the industrial asset classification module 414, the firmware update module 416, the functionality change module 418, the configuration change module 420, the software update module 422, the decision support module 424, the data storage module 426, the data adapter module 428, the service adapter module 430, the data mining module 432, and the supervised learning module 434. Alternative embodiments may include data processing modules that perform other data processing functions.

An example of an implementation of workflow management using the workflow management module 410 at the data processing system 202 is determining whether an industrial asset 102A, 102B should continue to operate in a degraded state until scheduled maintenance occurs. An example of an implementation of decision support using the decision support module 424 at the data processing system 202 is specifying a maintenance plan for an industrial asset 102A, 102B and providing information associated with the maintenance plan via the user interface system 204. Examples of information associated with a maintenance plan include, but are not limited to, costs, impact, constraints, timing, criticality, objectives, and risks. An example of an implementation of data storage using the data storage module 426 at the data processing system 202 is storing asset data and processed asset data in the data processing system database 404. In an embodiment, the data processing system database 404 is configured to be accessible to the user interface system 204. An example of an implementation of the data adapter module 428 at the data processing system 202 is a processing of measured values. An example of an implementation of the service adapter module 430 at the data processing system 202 relates to operations, such as for example, changing a set point for turning a component off or on.

In an embodiment the data processing system 202 is configured to receive asset data from the data acquisition system 200 via the communication system 206. Examples of asset data include, but are not limited to, raw asset data received at the data acquisition system 200, formatted and/or configured asset data generated by the data acquisition system 200, asset operating data and asset performance data.

In an embodiment, the asset data is received at one or more of the data processing modules 406, 408, 410, 412, 414, 416, 418, 420, 422, 424, 426, 428, 430, 432, 434 for the performance of data processing functions. In an embodiment, the data processing system 202 is configured to aggregate all of or a subset of the asset data received from the data acquisition system 200.

In an embodiment, the data processing system 202 is configured to manage the data acquisition subsystems 302A, 302B in the data acquisition system 200. In an embodiment, the data processing system 202 is configured to manage industrial assets 102A, 102B via industrial asset management instructions transmitted to the data acquisition system 200 via the communication system 206. Examples of industrial asset management instructions transmitted from the data processing system 202 to the data acquisition system 200 include, but are not limited to, firmware updates and configuration changes.

In the embodiment where the data processing system 202 is configured to manage the data acquisition subsystems 302A, 302B in the data acquisition system 200, in the event a fault associated with the data acquisition system 200 occurs, the data processing system 202 may implement a non-disruptive failover operation. For example, if communications between a specific data acquisition subsystem 302A, 302B and the data processing system 202 is disrupted, instructions from the data processing system 202 intended for that data acquisition subsystem 302A, 302B may be stored at the data processing system database 404 and forwarded to that data acquisition subsystem 302A, 302B once communications between the data processing system 202 and that data acquisition subsystem 302A, 302B has been reestablished.

In an example, the data processing system 202, may detect a change associated with the data acquisition system 200. In an embodiment, the data processing computation system 402 is configured to detect the change associated with the data acquisition system 200. The change associated with the data acquisition system 200 may for example include, but is not limited to, an addition of a new data acquisition subsystem 302A, 302B, a removal of an existing data acquisition subsystem 302A, 302B, a changed data acquisition subsystem 302A, 302B, a reconfigured data acquisition subsystem 302A, 302B, a fault at a data acquisition subsystem 302A, 302B, a disruption in communication between the data acquisition system 200 and the data processing system 202, and a change in the rate at which asset data is being acquired by the data acquisition system 200.

Responsive to detecting the change associated with the data acquisition system 200, the data processing system 202 may modify the industrial asset health management system 200. For example, the data processing system 202 may responsively modify one or more of the data acquisition system 200, the data processing computational system 402, the data processing database 404, and one or more of the data processing modules 406, 408, 410, 412, 414, 416, 418, 420, 422, 424, 426, 428, 430, 432, 434, and an industrial asset 102A, 102B.

The data processing system 202 is configured to continue processing the asset data received from the data acquisition system 200 prior to the disruption in communication between the data processing system 202 and the data acquisition system 200. The data acquisition system 200 is configured to continue collection of asset data and the data processing system 202 is configured to continue processing the asset data received from the data acquisition system 200 prior to the disruption in communication between the data processing system 202 and the data acquisition system 200. The detected change at the data acquisition system 200 and/or any modifications performed may be displayed at the user interface system 204.

In an embodiment, the data processing system 202 may be configured to perform a protocol conversion on the asset data received from the data acquisition system 200. For example, the data processing system 202 may be configured to convert the asset data received from the data acquisition system 200 from a first protocol used by the data acquisition system 200 to a second protocol used by a destination system, such as for example, a reporting tool at the user interface system 204.

In an embodiment, the data processing system 202 may be configured to store the asset data as a raw data record, a calculated value, or an analytical result generated using by the data processing computational system 402. The data processing system 202 may apply various analytics, computational functionality, and/or business intelligence to the asset data using one or more of the one or more of the data processing modules 406, 408, 410, 412, 414, 416, 418, 420, 422, 424, 426, 428, 430, 432, 434. In an embodiment, the data processing system 202 is configured to store the processed data generated by the data processing system 202 based on the asset data in the data processing system database 404. In an embodiment, the user interface system 204 is provided with access to the data processing system database 404.

In an example, data processing system 202 may be configured implement workflow management and/or schedule maintenance for an industrial asset 102A, 102B. For example, if the asset data is operating asset data associated with an industrial asset 102A, 102B and the asset data is determined to be operating below specifications for that industrial asset 102A, 102B, then the data processing system 202 may implement a workflow plan where the industrial asset 102A, 102B continues operation in a degraded state until a scheduled maintenance is performed.

In an embodiment, in the event a fault associated with the user interface system 204 occurs, the data processing system 202 may implement a non-disruptive failover operation. For example, if communications between the user interface system 204 and the data processing system 202 is disrupted, asset data and processed asset data may be stored at the data processing system database 404 in accordance with instructions transmitted from the data processing computation system 402 to the data processing system database 404 and forwarded to the user interface system 204 once communications between the data processing system 202 and the user interface system 204 is reestablished.

Figure 5:
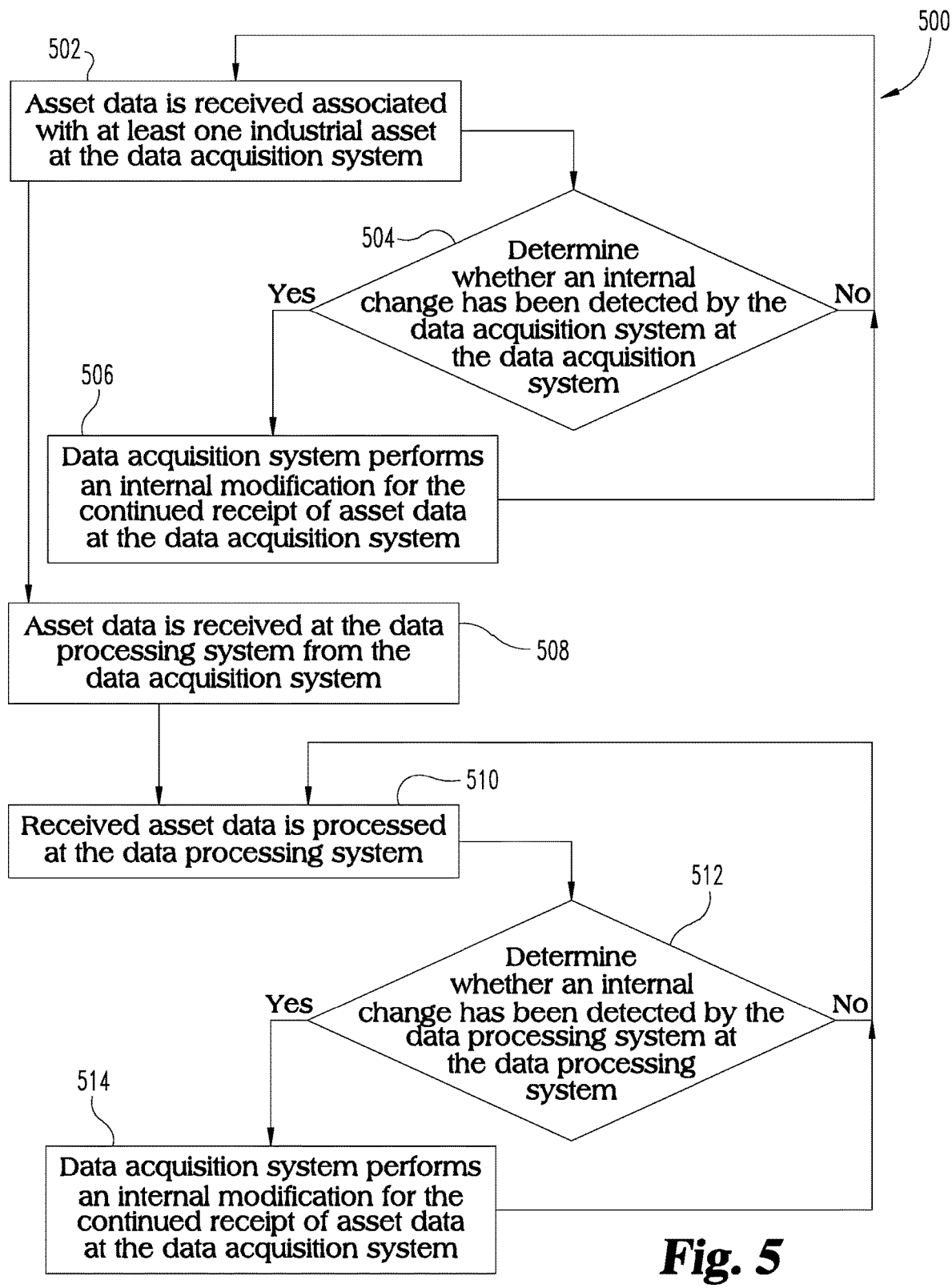
FIG. 5 is a flowchart representation of an embodiment of a method of managing industrial assets.

Referring to FIG. 5, a flowchart representation of an embodiment of a method of managing industrial assets 500 is shown. Asset data is received from at least one industrial asset 102A, 102B at a data acquisition system 200 at 502.

A determination is made regarding whether an internal change is detected at the data acquisition system 200 by the data acquisition system 200 at 504. If an internal change is detected at the data acquisition system 200, the data acquisition system 200 performs an internal modification to enable the continued receipt of asset data from the at least one industrial asset at 506 and the data acquisition system 200 receives asset data from the at least one industrial asset 102A, 102B at 502. If an internal change is not detected at the data acquisition system 200, the data acquisition system 200 continues to receive asset data from the at least one industrial asset 102A, 102B at 502.

Asset data is received from the data acquisition system 200 at the data processing system 202 at 508. The received asset data is processed at the data processing system 202 at 510.

A determination is made regarding whether an internal change is detected at the data processing system 202 by the data processing system 202 at 512. If an internal change is detected at the data processing system 202, the data processing system 202 performs an internal modification for the continued processing of the asset data at 514 and the data processing system 202 processes received asset data at 510. The internal modification can include an enablement of the continued processing of the asset data. The continued processing of the asset data can include a modification of the asset data processing, the modification or suspension of the asset data acquisition, and/or the modification or starting of an alternative asset data acquisition. If an internal change is not detected at the data processing system 202, the data processing system 202 continues to process the received asset data at 510.

While a number of different processes have been described in a particular sequence in method 500, the different processes may be performed in a different order.

Figure 6:
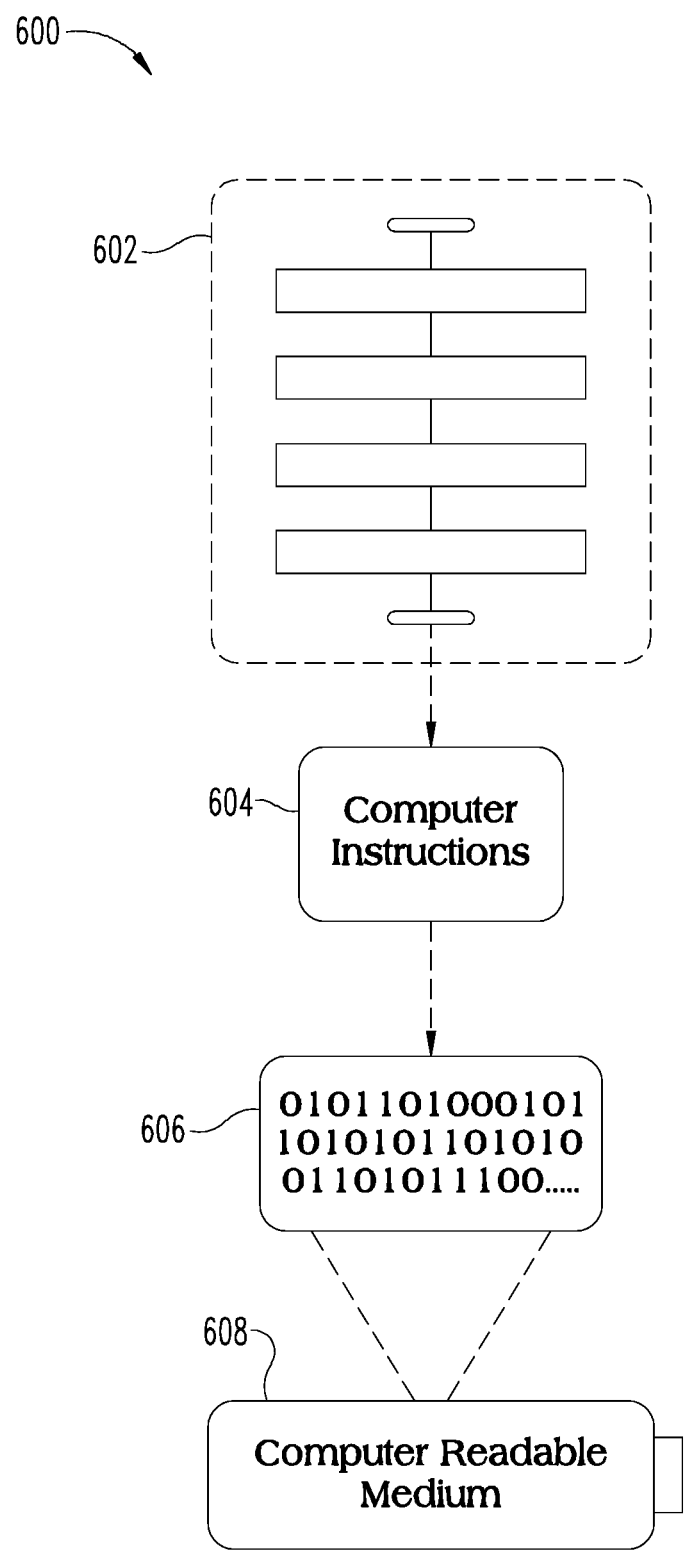
FIG. 6 is a block diagram representation of an exemplary computing device-readable medium wherein processor-executable instructions configured to embody one or more of the provisions set forth may be comprised.

Referring to FIG. 6, a block diagram representation of an exemplary computing device-readable medium wherein processor-executable instructions configured to embody one or more of the provisions set forth may be comprised is shown.

An embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform methods, such as at least some of the exemplary methods of managing industrial assets of as illustrated, for example, in FIG. 5. In some embodiments, the processor-executable instructions 604 are configured to implement a system, such as at least some of the exemplary industrial asset management system 100 of FIG. 2, at least some of the exemplary data acquisition system 200 system of FIG. 3, at least some of the exemplary data processing system 202 of FIG. 4, and/or at least some of the exemplary user interface system 204 shown in FIG. 2, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "subsystem," "interface", "unit" and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

For example, a module may be, but is not limited to being, a process running on a processor, a processor, an object, an executable, a thread of execution, a program, and/or a computer. By way of illustration, both an application running on a controller and the controller can be a module. One or more modules may reside within a process and/or thread of execution and a module may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
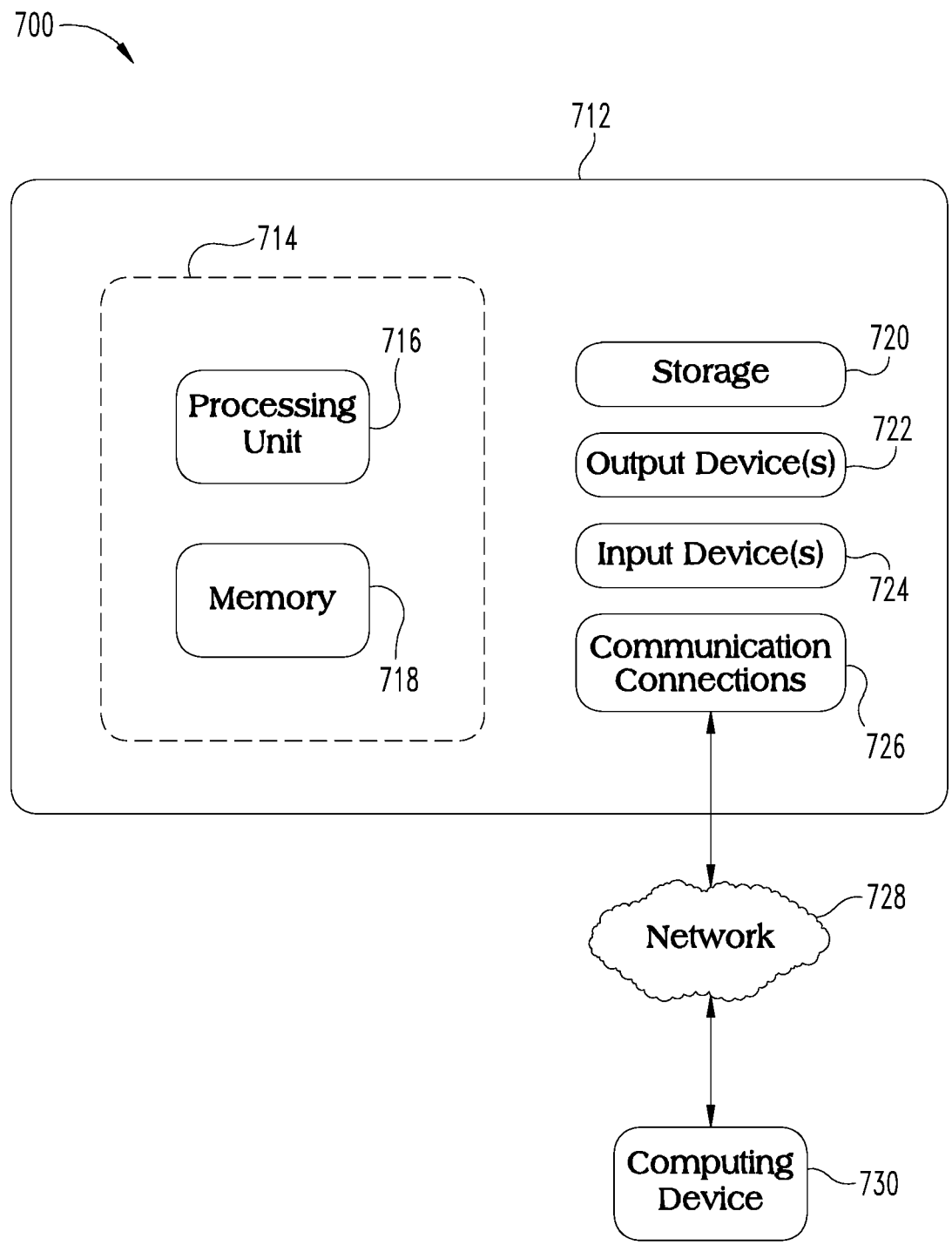
FIG. 7 is a block diagram representation of an exemplary computing environment wherein one or more of the provisions set forth herein may be implemented.

Referring to FIG. 7, a block diagram representation of an exemplary computing environment wherein one or more of the provisions set forth herein may be implemented is shown. FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing system 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing system 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 122 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory systems located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components, systems, subsystems and modules (e.g., elements, resources, etc.), the terms used to describe components, systems, subsystems and modules are intended to correspond, unless otherwise indicated, to any components, systems, subsystems and modules which performs the specified function of the described components, systems, subsystems and modules (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An industrial asset management system, comprising:
    a first data acquisition system configured to receive asset data associated with at least one industrial asset and to modify the first data acquisition system to enable the continued receipt of asset data associated with the at least one industrial asset in response to a detection of an internal change at the first data acquisition system by the first data acquisition system; and
    a first data processing system communicatively coupled to the first data acquisition system and configured to process the asset data received from the first data acquisition system and to modify the first data processing system for the continued processing of the asset data in response to a detection by the data processing system of an internal change at the first data processing system or the first data acquisition system.

2. The industrial asset management system of claim 1, wherein the first data processing system is configured to modify the first data acquisition system in response to a detection of a change associated with the data acquisition system at the first data processing system.

3. The industrial asset management system of claim 1, further comprising a user interface system communicatively coupled to the first data processing system and configured to display at least one of the asset data, processed asset data generated by the first data processing system and modification data associated with a modification of at least one of the first data acquisition system and the first data processing system.

4. The industrial asset management system of claim 3, wherein the first data processing system is configured to detect a communication disruption between the first data processing system and the user interface system and responsively store data generated by the data processing system at the data processing system during the communication disruption and to transmit the stored data to the user interface system upon restoration of communication.

5. The industrial asset management system of claim 1, wherein the first data acquisition system is configured to receive asset data associated with at least one industrial asset selected from a group consisting of a transmission line, a substation transformer, a circuit breaker, an inverter, a controller, a power storage device, and a power source.

6. The industrial asset management system of claim 1, wherein the first data processing system is configured to be restricted from initiating communication with the first data acquisition system.

7. The industrial asset management system of claim 1, further comprising a second data acquisition system wherein the first data acquisition system is configured to modify the second data acquisition system to enable the continued receipt of asset data associated with the at least one industrial asset in response to the first data acquisition system detecting a change in the second data acquisition system.

8. The industrial asset management system of claim 1, further comprising a second data processing system wherein the first data processing system is configured to modify the second data processing system for the continued processing of asset data received from the first data acquisition system in response to the first data processing system detecting a change in the second data processing system.

9. The industrial asset management system of claim 1, wherein the first data acquisition system is configured to modify the first data acquisition system to enable the continued receipt of asset data associated with the at least one industrial asset in response to the detection of an internal change at the first data acquisition system comprising one of a removal, an addition, a reconfiguration, a replacement, a modification, a fault condition, and a failure of a component of the first data acquisition system.

10. The industrial asset management system of claim 1, wherein the first data processing system is configured to modify the first data processing system for the continued processing of asset data received from the first data acquisition system in response to the detection of an internal change at the first data processing system comprising one of a removal, an addition, a reconfiguration, a replacement, a modification, a fault condition and a failure of a component of the first data processing system.

11. The industrial asset management system of claim 1, wherein the first data acquisition system is configured to detect a removal of a component of the first data acquisition system and responsively disable communication between the removed component and the first data acquisition system.

12. The industrial asset management system of claim 1, wherein the first data processing system is configured to detect a removal of a component from the first data processing system and responsively disable communication between the removed component and the first data processing system.

13. The industrial asset management system of claim 1, wherein the first data acquisition system is configured to detect a communication disruption between the first data acquisition system and the first data processing system and responsively store the asset data associated with the at least one industrial asset during the communication disruption, and to transmit the stored asset data to the first data processing system upon restoration of communication.

14. The industrial asset management system of claim 1, wherein the first data acquisition system is configured to modify the first data acquisition system in response to detection of a change at one of the at least one industrial asset, the change comprising at least one of a removal, an addition, a reconfiguration, a replacement, a modification, a repair, a change in location, a fault condition and a failure of the one of the at least one industrial asset.

15. The industrial asset management system of claim 14, wherein the detection of the change at the at least one industrial asset is based on at least one of a change in the received asset data, a reduction in the received asset data, an increase in the received asset data, and a deviation from expected asset data values.

16. The industrial asset management system of claim 1, wherein the data processing system comprises at least one data processing module selected from a group consisting of a calculated value module, a statistical analysis module, a workflow management module, a trending module, an industrial asset classification module, a firmware update module, a functionality change module, a configuration change module, a software update module, a decision support module, a data storage module, a data adapter module, a service adapter module, a data mining module, and a machine learning module.

17. The industrial asset management system of claim 1, wherein at least one of:
the first data acquisition system includes a plurality of data acquisition systems configured to receive asset data associated with a plurality of industrial assets;
the first data processing system includes a plurality of data processing systems configured to process asset data associated with a plurality of industrial assets; and
the first user interface system includes a plurality of user interface systems configured to display asset data associated with a plurality of industrial assets.

18. An method of managing industrial assets of an industrial system, comprising:
receiving asset data associated with at least one industrial asset at a data acquisition system;
if an internal change is detected at the data acquisition system by the data acquisition system, performing an internal modification at the data acquisition system for the continued receipt of asset data associated with the at least one industrial asset;
receiving asset data from the data acquisition system at a data processing system;
processing the received asset data at the data processing system; and
if an internal change is detected at the data processing system by the data processing system, performing an internal modification at the data processing system or the data acquisition system for the continued processing of the asset data.

19. The method of claim 18, further comprising:
receiving at a user interface system at least one of the asset data, processed asset data generated by the data processing system and modification data associated with a modification made to at least one of the data acquisition system and the data processing system; and
displaying with the user interface system the at least one of the asset data, processed asset data generated by the data processing system and modification data associated with a modification of at least one of the data acquisition system and the data processing system.

20. A power transmission and distribution asset management system, comprising:
a data acquisition system configured to receive asset data associated with at least one power transmission and distribution system asset and to modify the data acquisition system to enable the continued receipt of asset data associated with the at least one power transmission and distribution system asset in response to a detection of an internal change at the data acquisition system by the data acquisition system; and
a data processing system communicatively coupled to the data acquisition system and configured to process the asset data received from the data acquisition system and to modify the data processing system for the continued processing of the asset data in response to a detection by the data processing system of an internal change at the data processing system or the data acquisition system.

21. The power transmission and distribution asset management system of claim 20, further comprising a user interface system communicatively coupled to the data processing system and configured to display at least one of the asset data, processed asset data generated by the data processing system and modification data associated with a modification of at least one of the data acquisition system and the data processing system.

22. The power transmission and distribution system of claim 21, wherein the data processing system is configured to detect a communication disruption between the data processing system and the user interface system and responsively store data generated by the data processing system at the data processing system during the communication disruption and to transmit the stored data to the user interface system upon restoration of communication.

23. The power transmission and distribution system of claim 20, wherein the data acquisition system is configured to detect a communication disruption between the data acquisition system and the data processing system and responsively store the asset data associated with the at least one power transmission and distribution asset during the communication disruption, and to transmit the stored asset data to the first data processing system upon restoration of communication.

* * * * *